United States Patent
Vos et al.

(10) Patent No.: US 11,381,349 B2
(45) Date of Patent: Jul. 5, 2022

(54) METHOD AND APPARATUS FOR FACILITATING TRANSMISSIONS IN A WIRELESS COMMUNICATION SYSTEM

(71) Applicant: SIERRA WIRELESS, INC., Richmond (CA)

(72) Inventors: Gustav Gerald Vos, Surrey (CA); Gautham Prasad, Vancouver (CA)

(73) Assignee: SIERRA WIRELESS, INC., Richmond (CA)

( * ) Notice: Subject to any disclaimer, the term of this patent is extended or adjusted under 35 U.S.C. 154(b) by 0 days.

(21) Appl. No.: 17/062,161

(22) Filed: Oct. 2, 2020

(65) Prior Publication Data
US 2021/0105099 A1 Apr. 8, 2021
US 2021/0409163 A9 Dec. 30, 2021

Related U.S. Application Data

(60) Provisional application No. 62/927,988, filed on Oct. 30, 2019, provisional application No. 62/910,192, filed on Oct. 3, 2019.

(51) Int. Cl.
*H04L 1/18* (2006.01)
*H04L 1/16* (2006.01)

(52) U.S. Cl.
CPC .......... *H04L 1/1819* (2013.01); *H04L 1/1614* (2013.01); *H04L 1/1887* (2013.01)

(58) Field of Classification Search
CPC ... H04L 1/1614; H04L 1/1822; H04L 1/1819; H04L 1/1887; H04L 1/1864; H04L 1/1812
See application file for complete search history.

(56) References Cited

U.S. PATENT DOCUMENTS 8,588,142 B2 * 11/2013 Seo ................... H04L 1/1835
370/328
9,043,666 B2 5/2015 Kotecha et al.
(Continued)

FOREIGN PATENT DOCUMENTS

EP 3272050 A1 1/2018
WO 2010039738 A2 4/2010
(Continued)

OTHER PUBLICATIONS

3rd Generation Partnership Project; Technical Specification Group Radio Access Network; Evolved Universal Terrestrial Radio Access (E-UTRA) Multiplexing and Channel Coding (Release 12); 3GPP TS 36.212 V.12.5.0 (Jun. 2015) Technical Specification; 94 pages.
(Continued)

*Primary Examiner* — Mandish K Randhawa
(74) *Attorney, Agent, or Firm* — Umberg Zipser LLP; Ryan Dean

(57) ABSTRACT

There is provided methods and associated base station and user equipment, for facilitating transmissions in a wireless communication system. The mapping between an index and its corresponding HARQ ID or HARQ ID & NDI pair can be done using one or more equations relating the two entities. The equations can be defined in two configurations, one for encoding HARQ ID or HARQ ID & NDI pair and a second for decoding the encoded HARQ ID or HARQ ID & NDI pair to determine the HARQ ID or HARQ ID and NDI.

16 Claims, 6 Drawing Sheets

(56) References Cited

U.S. PATENT DOCUMENTS

| | | | |
|---|---|---|---|
| 9,706,567 B2* | 7/2017 | Yang | H04L 5/0092 |
| 9,907,062 B2 | 2/2018 | McBeath et al. | |
| 9,912,504 B2 | 3/2018 | Krzymien et al. | |
| 2009/0307554 A1 | 12/2009 | Marinier et al. | |
| 2010/0064061 A1 | 3/2010 | Warren et al. | |
| 2010/0098006 A1 | 4/2010 | Elbwart et al. | |
| 2010/0251054 A1 | 9/2010 | Cai et al. | |
| 2010/0260130 A1 | 10/2010 | Earnshaw et al. | |
| 2010/0281486 A1 | 11/2010 | Lu et al. | |
| 2011/0122825 A1 | 5/2011 | Lee et al. | |
| 2011/0243039 A1 | 10/2011 | Papasakellariou et al. | |
| 2011/0300854 A1 | 12/2011 | Shan et al. | |
| 2012/0033650 A1 | 2/2012 | Ahn et al. | |
| 2012/0195267 A1 | 8/2012 | Dai et al. | |
| 2012/0300616 A1 | 11/2012 | Zeng et al. | |
| 2013/0235812 A1 | 9/2013 | Heo et al. | |
| 2014/0153484 A1 | 6/2014 | Kim et al. | |
| 2014/0269452 A1 | 9/2014 | Papasakellariou | |
| 2014/0293893 A1 | 10/2014 | Papasakellariou et al. | |
| 2014/0321418 A1 | 10/2014 | Rinne et al. | |
| 2015/0098370 A1 | 4/2015 | Lee | |
| 2015/0098418 A1 | 4/2015 | Vajapeyam et al. | |
| 2015/0200751 A1 | 7/2015 | Yin et al. | |
| 2015/0264678 A1 | 9/2015 | Yin et al. | |
| 2015/0280876 A1 | 10/2015 | You et al. | |
| 2015/0305003 A1 | 10/2015 | Chen et al. | |
| 2016/0037524 A1 | 2/2016 | Krzymien et al. | |
| 2016/0095133 A1 | 3/2016 | Hwang et al. | |
| 2017/0094644 A1 | 3/2017 | Vos | |
| 2017/0302493 A1* | 10/2017 | Yang | H04L 1/0029 |
| 2018/0006791 A1 | 1/2018 | Marinier et al. | |
| 2018/0176945 A1 | 6/2018 | Cao et al. | |
| 2018/0234212 A1 | 8/2018 | Park et al. | |
| 2019/0075589 A1 | 3/2019 | Jeon et al. | |
| 2019/0141778 A1 | 5/2019 | Pedersen | |
| 2019/0149274 A1 | 5/2019 | Freda et al. | |
| 2019/0268930 A1 | 8/2019 | Rudolf et al. | |
| 2020/0053750 A1 | 2/2020 | Vos | |
| 2020/0053769 A1 | 2/2020 | Vos | |
| 2020/0178288 A1 | 6/2020 | Chang et al. | |
| 2020/0389873 A1 | 12/2020 | Liu et al. | |

FOREIGN PATENT DOCUMENTS

| | | |
|---|---|---|
| WO | 2011094926 A1 | 8/2011 |
| WO | 2017049413 A1 | 3/2017 |
| WO | 2017194822 A1 | 11/2017 |
| WO | 2018085717 A1 | 5/2018 |
| WO | 2020028993 A1 | 2/2020 |
| WO | 2020145652 A1 | 7/2020 |
| WO | 2020204376 A1 | 10/2020 |
| WO | 2021062551 A1 | 4/2021 |

OTHER PUBLICATIONS

Coverage Enhancements for M-PDCCH, 3GPP TSG-RAN WG1 Meeting #81, Fukuoka, Japan, May 25-29, 2015, 14 pages.
New WID on REL 16 MTC Enhancements for LTE, 3GPP TSG RAN Meeting #80, La Jolla, California, USA, Jun. 11-14, 2018, 4 pages.
PCT International Search Report, International Application No. PCT/CA2016/051124, International Filing Date Sep. 23, 2016, 4 pages.
PCT International Search Report, International Application No. PCT/CA2019/051095, International Filing Date Aug. 8, 2019, 4 pages.
PCT International Search Report, International Application No. PCT/CA2020/051322, International Filing Date Oct. 2, 2020, 4 pages.
PCT International Written Opinion, International Application No. PCT/CA2016/051124, International Filing Date Sep. 23, 2016, 6 pages.
PCT International Written Opinion, International Application No. PCT/CA2019/051095, International Filing Date Aug. 9, 2019, 6 pages.
PCT International Written Opinion, International Application No. PCT/CA2020/051322, International Filing Date Oct. 2, 2020, 6 pages.
Performance of M-PDCCH With Frequency Offset, 3GPP TSG RAN WG1 Meeting #81, Fukuoka, Japan, May 25-29, 2015, 9 pages.
Performance of Time Diversity for PUSCH and HARQ Impacts, 3GPP TSG RAN WG1 Meeting #82, Beijing, China, Aug. 24-28, 2015, 5 pages.
PUSCH Summary of Submitted Tdocs on RAN #81, 3GPP TSG-RAN WG1 Meeting 81, Fukuoka, Japan, May 25-29, 2015, 3 pages.
PUSCH Summary RAN #1 80bis, 3GPP TSG RAN WG1 Meeting #80bis, Belgrade, Serbia, Apr. 20-24, 2015, 4 pages.
U.S. Final Office Action, U.S. Appl. No. 16/536,964, dated Apr. 30, 2021, 28 pages.
U.S. Final Office Action, U.S. Appl. No. 16/537,152, dated Jul. 23, 2021, 80 pages.
U.S. Non-Final Office Action, U.S. Appl. No. 15/276,053, dated Jul. 20, 2018, 16 pages.
U.S. Non-Final Office Action, U.S. Appl. No. 16/536,964, dated Jan. 8, 2021, 9 pages.
U.S. Non-Final Office Action, U.S. Appl. No. 16/536,964, dated Sep. 15, 2021, 19 pages.
U.S. Non-Final Office Action, U.S. Appl. No. 16/537,152, dated Jan. 6, 2022, 79 pages.
U.S. Non-Final Office, U.S. Appl. No. 16/537,152, dated Feb. 5, 2021, 50 pages.
U.S. Notice of Allowance, U.S. Appl. No. 15/276,053, dated Oct. 21, 2018, 13 pages.
European Patent Office, Extended European Search Report, dated Apr. 25, 2022; European Application No. 19846668.2, International Filing Date Aug. 9, 2019, 9 pages.
Samsung: "Procedures for Grant-Based UL Transmissions," R1-1710722, XP051304352, Jun. 16, 2017, 3 pages.
Sierra Wireless: "DCI Requirements to support Time Diversity," R1-155684, XP051041745, Sep. 25, 2015, 5 pages.

* cited by examiner

METHOD AND APPARATUS FOR FACILITATING TRANSMISSIONS IN A WIRELESS COMMUNICATION SYSTEM

CROSS-REFERENCE TO RELATED APPLICATIONS

This application claims the benefit and priority of U.S. Provisional Patent Application 62/910,192 titled "Method and Apparatus for Joint Coding of HARQ ID and NDI" filed Oct. 3, 2019. This application additionally claims the benefit and priority of U.S. Provisional Patent Application 62/927,988 titled "Method and Apparatus for Joint Coding of HARQ ID and NDI" filed Oct. 30, 2019. The foregoing applications are incorporated by reference herein in their entirety.

FIELD OF THE INVENTION

The present invention pertains in general to wireless communication systems operating according to standards such as the Long Term Evolution (LTE), and in particular to mechanisms for multi-transport block grant transmissions for Category M User Equipment (UE).

BACKGROUND

The Long Term Evolution (LTE) wireless communication standard offers a high-capacity, high-speed wireless interface for use by mobile phones, data terminals, machine-type-communication (MTC) or machine-to-machine (M2M) equipment, and the like. However, in some instances it may be desirable to sacrifice aspects of an LTE terminal's performance, for example data capacity, in order to gain other benefits, such as reduced complexity and/or cost. The 3 Generation Partnership Project has considered such possibilities, for example in connection with "low-cost" or "limited capability" User Equipment (UE), also referred to as a CAT-M UE.

The 3GPP (Third Generation Partnership Project) standards committees have recognized the need for LTE to support very large numbers of M2M user equipment (UEs) and have identified objectives for modifications to the existing LTE standards designed to support very large numbers of M2M UEs. Common requirements for such modifications are that they maintain compatibility with existing devices and limit the impact of M2M traffic on the high data rate and low latency requirements of current and future users.

In Release 15 or earlier, multiple transport blocks (TBs) must be scheduled individually. For example, with reference to FIG. 1, TBs with 4 repeats each are illustrated, wherein each set of TB repeats, e.g. four TB1s 110 and four TB2s 120 occur after a grant 105, 115. It is noted that the configuration as illustrated in FIG. 1, there are a lot of unused sub-frames (SF) which slows the data rate and uses a lot of MTC physical downlink control channel (MPDCCH) resources to schedule each grant. 3GPP has agreed that Multi-TB scheduling via a multi-TB grant (MTBG) could be specified in Rel 16 for LTE-M (RP-181450) and NB-IOT (RP-181450). Allowing multiple TBs per grant will result in more efficient scheduling as illustrated in FIG. 2, wherein there are 8 TBs with 4 repeats each, e.g.; four TB1 205, four TB2 210 and four TB3 215.

For uplink (UL) and downlink (DL) grants there is a requirement that there is an indication of which hybrid automatic repeat request identifiers (HARQ IDs) are being scheduled and their corresponding new data indication (NDI) values. It is known that up to 8 HARQ processes are supported in Mode A. As such, specifying the scheduled HARQ IDs occupies up to 8 bits data in the grant when using a bit mask, where a 1 in the bit mask indicates that a HARQ ID is scheduled. The NDI field is also 8-bits long with each NDI bit indicating the status of its corresponding HARQ ID. Therefore, this combination of HARQ ID and NDI consumes a total of 16 bits of data in the grant to indicate HARQ IDs and NDIs.

Therefore there is a need for a method and system for transmitting control information for Category M User Equipment (UE) that can reduce the total bits required for the transmission of the HARQ ID and NDI.

This background information is provided for the purpose of making known information believed by the applicant to be of possible relevance to the present invention. No admission is necessarily intended, nor should be construed, that any of the preceding information constitutes prior art against the present invention.

SUMMARY

An object of the present invention is to provide a method and apparatus for facilitating transmissions in a wireless communication system. In accordance with an aspect of the present invention, there is provided a method for facilitating hybrid automatic repeat request identifier (HARQ ID) selection transmission in a wireless communication system. The method includes determining, by a base station, one or more hybrid automatic repeat request identifiers (HARQ IDs) to be used. The method further includes encoding, by the base station, the HARQ ID and a corresponding new data indication (NDI) to create an encoded HARQ ID-NDI. In addition, the method includes transmitting, by the base station, the encoded HARQ ID-NDI to a user equipment. In some embodiments, the encoding is performed using piecewise linear encoding.

In accordance with an aspect of the present invention, there is provided a base station including a processor and machine readable memory storing machine executable instructions. The machine executable instructions, when executed by the processor configure the base station to determine one or more hybrid automatic repeat request identifiers (HARQ IDs) to be used. The machine executable instructions, when executed by the processor further configure the base station to encode the HARQ ID and a corresponding new data indication (NDI) to create an encoded HARQ ID-NDI and to transmit the encoded HARQ ID-NDI to a user equipment.

In accordance with another aspect of the present invention, there is provided a method facilitating transmissions in a wireless communication system. The method includes receiving, by a user equipment (UE), an encoded hybrid automatic repeat request (HARQ ID)-new data indication (NDI) from a base station. The method further includes decoding, by the UE, the encoded HARQ ID-NDI to determine a HARQ ID and NDI for use during transmissions. In addition, the method includes transmitting, by the UE, a transmission to the base station using the HARQ ID and NDI. In some embodiments, the decoding is performed using piecewise linear encoding.

In accordance with an aspect of the present invention, there is provided a user equipment (UE) including a processor and machine readable memory storing machine executable instructions. The machine executable instructions, when executed by the processor configure the UE to receive an encoded hybrid automatic repeat request (HARQ ID)-new data indication (NDI) from a base station. The machine executable instructions, when executed by the processor further configure the UE to decode the encoded HARQ ID-NDI to determine a HARQ ID and NDI for use during transmissions and to transmit a transmission to the base station using the HARQ ID and NDI.

In accordance with another aspect of the present invention, there is provided a method facilitating transmissions in a wireless communication system. The method includes receiving, by a user equipment (UE), an index indicative of one or more hybrid automatic repeat request identifiers (HARQ IDs) for use during transmissions, the index defined using a constant, C, and a sum of a binomial coefficient function. The method further including determining, by the UE, the one or more HARQ IDs from the index and transmitting, by the UE, a transmission using the one or more HARQ IDs.

In some embodiments, the sum is a combinatoric sum including at least a sum of binomial functions of HARQ IDs. In some embodiments, the sum is a combinatoric sum including at least a sum of binomial functions of a number of HARQ processes conveyed by the index. In some embodiments, the sum is a combinatoric sum including at least a sum of binomial functions of a maximum number of HARQ processes conveyed by the index.

In some embodiments, the index is defined by:

Index'=C+sum(nchoosek(HARQ_Max−HARQ($n-i$), Mi)

where: n=the number of HARQ processes to be scheduled;
i=0 to n−1;
HARQ_Max=the maximum number of HARQ processes;
HARQ(i)=the HARQ ID of the i'th HARQ process scheduled and has values in the range {0, HARQ_Max−1};
Mi=n−i;
C=a scalar constant;
nchoosek(n,k.)=the binomial coefficient function;
wherein if (n−k)<0, nchoosek(n−k) returns 0.

In accordance with an aspect of the present invention, there is provided a user equipment (UE) including a processor and machine readable memory storing machine executable instructions. The machine executable instructions, when executed by the processor configure the UE to receive an index indicative of one or more hybrid automatic repeat request identifiers (HARQ IDs) for use during transmissions, the index defined using a constant, C, and a sum of a binomial coefficient function. The machine executable instruction, when executed by the processor further configure the UE to determine the one or more HARQ IDs from the index and transmit a transmission using the one or more HARQ IDs.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

These and other features of the invention will become more apparent in the following detailed description in which reference is made to the appended drawings.

DETAILED DESCRIPTION

The present invention provides a method and system for enabling multi-transport block scheduling, wherein there is the ability for joint coding of the HARQ ID and the NDI associated with the grant.

As previously noted for uplink (UL) and downlink (DL) grants there is a requirement that there is an indication of which hybrid automatic repeat request identifiers (HARQ IDs) are being scheduled and their corresponding new data indication (NDI) values. It is known that up to 8 HARQ processes are supported in Mode A. As such, specifying the scheduled HARQ IDs occupies up to 8 bits data in the grant when using a bit mask, where a 1 in the bit mask indicates that a HARQ ID is scheduled. The NDI field is also 8-bits long with each NDI bit indicating the status of its corresponding HARQ ID. Therefore, this combination of HARQ ID and NDI consumes a total of 16 bits of data in the grant to indicate HARQ IDs and NDIs. This identification of both the HARQ ID and the NDI thus result in a significant overhead associated with the grant.

It can be beneficial to use joint coding of the HARQ ID and NDI as this combination can save bits. Bits can be saved as when a specific HARQ ID bit is 0, and thus is not being used, the corresponding NDI bit for the HARQ ID is a "don't care," bit. As such, the NDI bit associated with the unused HARQ ID is redundant. This redundancy of data can be reduced by jointly coding the HARQ ID and the NDI to obtain a reduction in the total number of bits.

Figure 1:
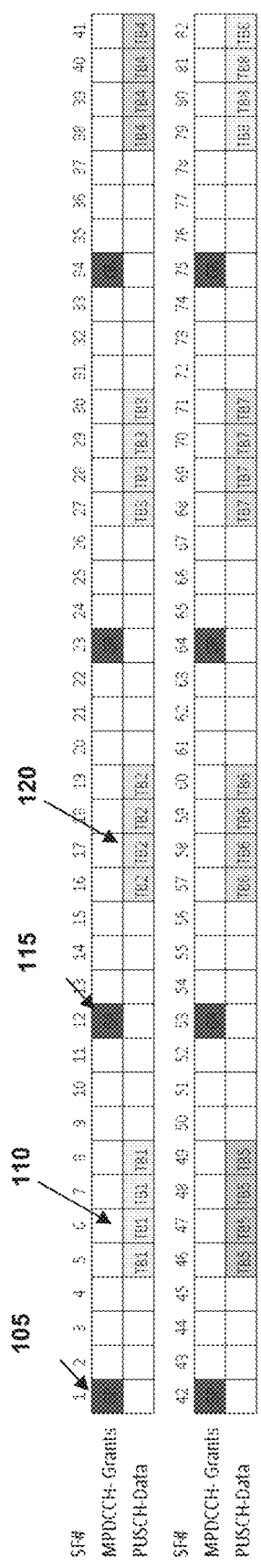
FIG. 1 illustrates a time line for Transmission Block (TB) repetition after Grant in an LTE system according to the prior art.
Figure 2:
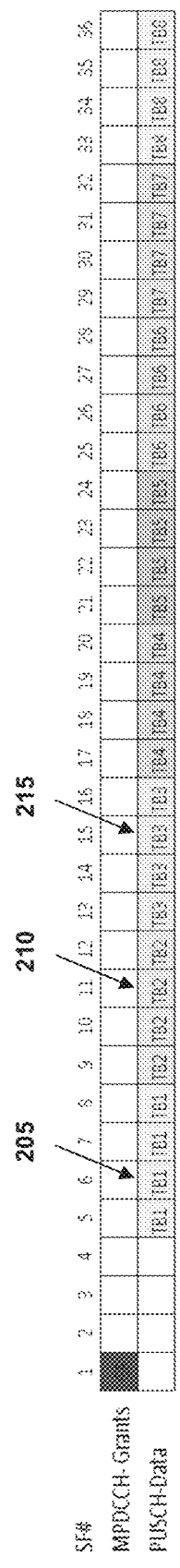
FIG. 2 illustrates a time line for multi TB repetition after Grant in an LTE system, in accordance with embodiments of the present invention.
Figure 3:
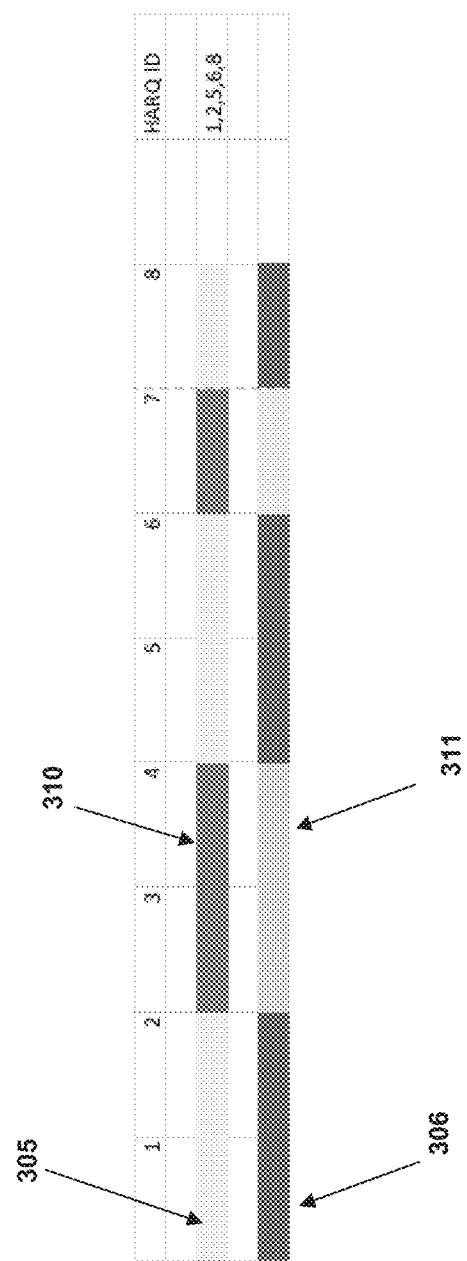
FIG. 3 illustrates a set of selected HARQ ID processes with the corresponding NDI, in accordance with embodiments of the present invention.

FIG. 3 illustrates a set of selected HARQ ID processes with the corresponding NDI, in accordance with embodiments of the present invention. This figure shows an example where the chosen HARQs are 1, 2, 5, 6, and 8. In this case, the NDI bits corresponding to HARQ ID #'s 3, 4, and 7 are redundant and are unused. For example, HARQ ID #1 305 has corresponding NDI 306 which are to be identified as being used, however HARQ ID #4 310 is not being used and thus the corresponding NDI 311 does not have to be defined as it is unnecessary.

For example, by joint coding the HARQ ID and the NDI, since there could be up to 8 possible HARQ ID #'s (1 to 8) and 2 possible NDIs (0 or 1) for each of them, the total number of states is $\Sigma_{n=1,2,3,4,5,6,7,8} C(8,n)*2^n=6560$ states, where C(8,2) indicates "8 choose 2". As there are only 6560 valid HARQ ID-NDI states, joint coding of the HARQ ID and NDI can be achieved using only 13 bits ($2^{13}$=8192>6560), resulting in a savings of 3 bits in total, when compared to the 16 bits required for the separate coding of the HARQ ID and NDI.

One way to achieve this joint coding is by using a lookup table with 6560 entries mapping each index to a specific HARQ ID-NDI combination or pair. However, this can be impractical to specify, impractical to implement, and can introduce a significant storage overhead to save 6560 entries of indexes and HARQ ID-NDI pairs.

According to embodiments, there is provided a method of mapping between the HARQ ID and NDI pairs and a respective index for each. The mapping between an index and its corresponding HARQ ID & NDI pair can be done using one or more equations relating the two entities. The equations can be defined in two configurations, one for encoding the HARQ ID and NDI pair and a second for decoding the encoded HARQ ID and NDI pair to determine the HARQ ID and NDI. According to embodiments, the encoding equation relates a HARQ ID & NDI pair to a unique index value. Conversely, according to embodiments the decoding equation, which is typically the inverse function of the encoding operation, extracts the HARQ ID and the corresponding NDI value from the index.

Figure 4:
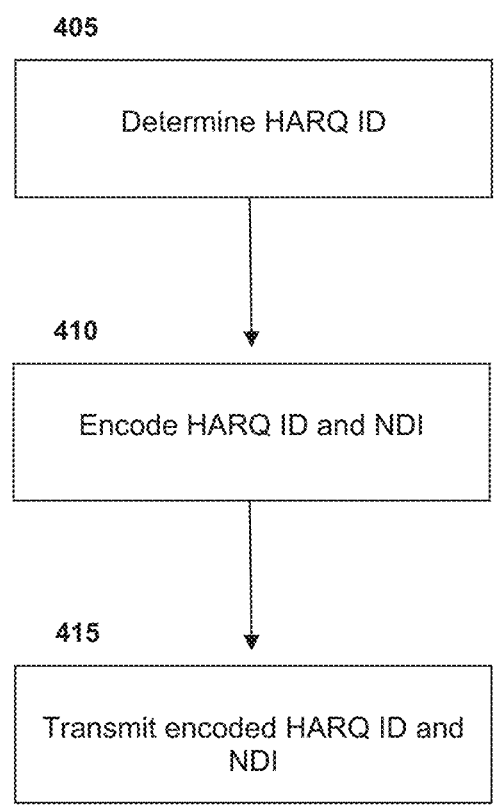
FIG. 4 illustrates a method for facilitating hybrid automatic repeat request identifier (HARQ ID) selection transmission in a wireless communication system in accordance with embodiments of the present invention.

According to embodiments, there is provided a method for facilitating hybrid automatic repeat request identifier (HARQ ID) selection transmission in a wireless communication system. With reference to FIG. 4, the method includes determining 405, by a base station, one or more hybrid automatic repeat request identifiers (HARQ IDs) to be used. The method further includes encoding 410, by the base station, the one or more HARQ IDs and their respective corresponding new data indication (NDI) to create encoded HARQ ID-NDI(s). In addition, the method includes transmitting 415, by the base station, the encoded HARQ ID-NDI(s) to a user equipment.

Figure 5:
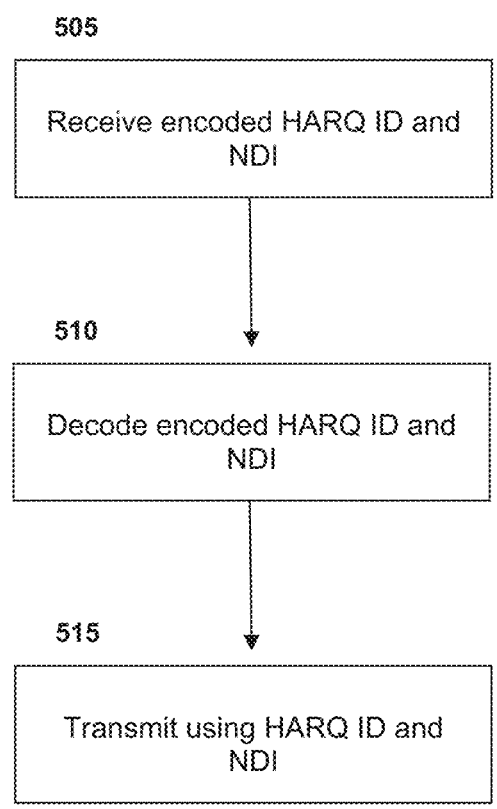
FIG. 5 illustrates a method for facilitating transmissions in a wireless communication system in accordance with embodiments of the present invention.

According to embodiments there is provided a method for facilitating transmissions in a wireless communication system. With reference to FIG. 5, the method includes receiving 505, by a user equipment (UE), an encoded hybrid automatic repeat request (HARQ ID)-new data indication (NDI) from a base station. The method further includes decoding 510, by the UE, the encoded HARQ ID-NDI to determine a HARQ ID and NDI for use during transmissions. In addition, the method includes transmitting 515, by the UE, a transmission to the base station using the HARQ ID and NDI.

According to some embodiments, the encoding and decoding of the HARQ ID and NDI pairs is performed using piecewise linear functions. According to embodiments, the method includes generating a HARQ number, for any n number of HARQ IDs, the HARQ number is generated as follows in Equation 1.

$$H_m = HARQ(n)*10^{(n-1)} + HARQ(n-1)*10^{(n-2)} \ldots + HARQ(1)*10^{(0)} \quad (1)$$

where the number of possible values of m are C(8,n).

In the example illustrated in FIG. 3, the selected HARQ IDs are 1, 2, 5, 6, 8. Since 5 HARQ IDs are chosen, n=5. Therefore, the HARQ number is equivalent to:

$$1*10^{(5-1)} + 2*10^{(5-2)} + 5*10(5-3) + 6*10^{(5-4)} + 8*10^{(5-5)} = 12568$$

According to embodiments, every HARQ number is also associated with $2^n$ possible values of NDI. In total there are $\Sigma=1,2,3,4,5,6,7,8 \, C(8,n)*2^n=6560$ possible HARQ ID-NDI pairs. According to embodiments, the 6560 possible states are divided as defined in TABLE 1, which defines Index ranges for HARQ ID-NDI pairs.

TABLE 1

| Index Range | # HARQs | # NDIs |
|---|---|---|
| 1-16 | 1 | 2 |
| 17-128 | 2 | 4 |
| 129-576 | 3 | 8 |
| 577-1696 | 4 | 16 |
| 1697-3488 | 5 | 32 |
| 3489-5280 | 6 | 64 |
| 5281-6304 | 7 | 128 |
| 6305-6560 | 8 | 256 |

According to embodiments, there is defined a linear mapping between the indexes and the HARQ ID & NDI pairs. A general linear (or affine) function is of the form, $y=a*x+b$, where a is the slope of the line and b is its y-intercept. Several such linear functions are used to generate the indexes corresponding to a HARQ ID-NDI pair. The procedure is further defined below.

For example, when the number of HARQs is equal to 1, there are 16 possible HARQ ID-NDI pairs and the corresponding indexes are as defined in TABLE 2.

TABLE 2

| HARQ ID | NDI | Index |
|---|---|---|
| 1 | 0 | 1 |
| 2 | 0 | 2 |
| 3 | 0 | 3 |
| 4 | 0 | 4 |
| 5 | 0 | 5 |
| 6 | 0 | 6 |
| 7 | 0 | 7 |
| 8 | 0 | 8 |
| 1 | 1 | 9 |
| 2 | 1 | 10 |
| 3 | 1 | 11 |
| 4 | 1 | 12 |
| 5 | 1 | 13 |
| 6 | 1 | 14 |
| 7 | 1 | 15 |
| 8 | 1 | 16 |

The encoding equation, Equation 2, is defined as:

$$\text{Index} = \text{HARQ ID} + 8*\text{NDI\_decimal} \quad (2)$$

where NDI_decimal is the decimal value of the NDI bitmap. For #HARQ=1, NDI bitmap=NDI_decimal The decoding equations, Equation 3 and Equation 4 are defined as follows:

$$\text{NDI\_decimal} = \text{floor}((\text{Index}-1)/8) \quad (3)$$

$$\text{HARQ ID} = \text{Index} - 8*\text{NDI\_decimal} \quad (4)$$

where floor(.) is the rounding function to the nearest integer towards minus infinity.

For example, when the number of HARQs is equal to 2, there are C(8,2)–28 HARQ ID combinations and $2^2$=4 NDI values, and therefore a total of 28*4=112 possible HARQ ID combinations & NDI values. The 28 HARQ IDs consequently produce 28 HARQ numbers, $H_1, \ldots H_2$, wherein the generation of the HARQ numbers is defined in Equation 1. The piecewise linear encoding equations for this example are defined as follows:

$$\text{Index} = \text{Index\_min} + H_m + 8*\text{NDI\_decimal}, \text{ for } m=1 \text{ to } 7$$

$$\text{Index} = \text{Index\_min} + H_m - 4 + 8*\text{NDI\_decimal}, \text{ for } m=8 \text{ to } 13$$

Index=Index_min+$H_m$−9+8NDI_decimal, for $m$=14 to 18

Index=Index_min+$H_m$−15+8*NDI_decimal, for $m$=19 to 22

Index=Index_min+$H_m$−22+8*NDI_decimal, for $m$=23 to 25

Index=Index_min+$H_m$−30+8*NDI_decimal, for $m$=26 to 27

Index=Index_min+$H_m$−39+8*NDI_decimal for $m$=28 where Index_min=16 is the minimum index value (i.e. the starting index) minus 1 for #HARQs=2 as shown in TABLE 1, and NDI_decimal is the decimal value of the 2 bit NDI. For example, the NDI_decimal can be defined as follows:

NDI_decimal=0, when NDI=0 0

NDI_decimal=1, when NDI=0 1

NDI_decimal=2, when NDI=1 0

NDI_decimal=3, when NDI=1 1.

It is noted that, in the above equations, only one shifting parameter varies in the linear equation pieces, and these equations can therefore be written as a single encoding equation form as defined in Equation 5.

Index=Index_min+$H_m$−Shift_parameter+$C$(8, #HARQs)*NDI_decimal   (5)

where,
Shift_parameter={0, 4, 9, 15, 22, 30, 39} for HARQID_max={0, 1, 2, 3, 4, 5, 6}
Comb_parameter={16, 12, 7, 1, −6, −14, −23} for HARQID_max={0, 1, 2, 3, 4, 5, 6}
where HARQID_max is the larger of the two HARQ IDs. The decoding equation for NDI is as defined in Equation 6.

NDI_decimal=floor((Index−Index_min−1)/$C$(8, #HARQs))   (6)

Once the NDI_decimal is determined, the HARQ numbers, $H_m$, and, consequently, the HARQ IDs can be extracted from the inverse of the encoding equation, for example the inverse of Equation 2. The extraction equation (i.e. the required shifting parameter) is chosen based on the Index generated.

It is noted that the encoding and decoding expressions for the number of HARQ=1 is a special case of the generalized encoding and decoding equations defined for the number of HARQ=2, wherein Index_min=0, $H_m$=HARQ ID, and Shift_parameter=0.

For example, when the number of HARQs is equal to 3, 4, 5, 6, 7 or 8 the encoding and decoding equations are similarly defined for each of the number of HARQ cases with a different shifting parameter and different Index_min value for each case. The number of piecewise equations required is dependent on the number of jumps seen in the HARQ number, i.e. the number of cases where $H_m$−$H_{m-1}$>1. According to embodiments, the following defines the Index_min values and the shift parameters used for different ranges of $H_m$.

For #HARQs=3, Index_min=128 are defined in Table 3.

TABLE 3

| Shift Parameter | $H_m$ Range |
|---|---|
| 11 | 012-017 |
| 16 | 023-027 |
| 22 | 034-037 |
| 29 | 045-047 |
| 37 | 056-057 |
| 46 | 067 |
| 101 | 123-127 |
| 107 | 134-137 |
| 114 | 145-147 |
| 122 | 156-157 |
| 131 | 167 |
| 197 | 234-237 |
| 204 | 245-247 |
| 212 | 256-267 |
| 221 | 267 |
| 298 | 345-347 |
| 306 | 356-357 |
| 315 | 367 |
| 403 | 456-457 |
| 412 | 467 |
| 511 | 567 |

For #HARQs=4, Index_min=576 are defined in Table 4.

TABLE 4

| Shift Parameter | $H_m$ Range |
|---|---|
| 122 | 123-127 |
| 128 | 134-137 |
| 135 | 145-147 |
| 143 | 156-157 |
| 152 | 167 |
| 218 | 234-237 |
| 225 | 245-247 |
| 233 | 256-257 |
| 242 | 267 |
| 319 | 345-347 |
| 327 | 356-357 |
| 336 | 367 |
| 424 | 456-457 |
| 433 | 467 |
| 532 | 567 |
| 1198 | 1234-1237 |
| 1205 | 1245-1247 |
| 1213 | 1256-1257 |
| 1222 | 1267 |
| 1299 | 1345-1347 |
| 1307 | 1356-1357 |
| 1316 | 1367 |
| 1404 | 1456-1457 |
| 1413 | 1467 |
| 1512 | 1567 |
| 2289 | 2345-2347 |
| 2297 | 2356-2367 |
| 2306 | 2367 |
| 2394 | 2456-2457 |
| 2403 | 2467 |
| 2502 | 2567 |
| 3390 | 3456-3457 |
| 3399 | 3467 |
| 3498 | 3567 |
| 4497 | 4567 |

For #HARQs=5, Index_min=1696 are defined in Table 5.

TABLE 5

| Shift Parameter | $H_m$ Range |
|---|---|
| 1233 | 1234-1237 |
| 1240 | 1245-1247 |
| 1248 | 1256-1257 |
| 1257 | 1267 |
| 1334 | 1345-1347 |
| 1342 | 1356-1357 |
| 1351 | 1367 |
| 1439 | 1456-1457 |
| 1448 | 1467 |
| 1547 | 1567 |
| 2324 | 2345-2347 |
| 2332 | 2356-2357 |
| 2341 | 2367 |
| 2429 | 2456-2457 |
| 2438 | 2467 |
| 2537 | 2567 |
| 3425 | 3456-3457 |
| 3434 | 3467 |
| 3533 | 3567 |
| 4532 | 4567 |
| 12309 | 12345-12347 |
| 12317 | 12356-12357 |
| 12326 | 12367 |
| 12414 | 12456-12457 |
| 12423 | 12467 |
| 12522 | 12567 |
| 13410 | 13456-13457 |
| 13419 | 13467 |
| 13518 | 13567 |
| 14517 | 14567 |
| 23405 | 23456-23457 |
| 23414 | 23467 |
| 23513 | 23567 |
| 23512 | 24567 |
| 34511 | 34567 |

For #HARQs=6, Index_min=3488 are defined in Table 6.

TABLE 6

| Shift Parameter | $H_m$ Range |
|---|---|
| 12344 | 12345-12347 |
| 12352 | 12356-12357 |
| 12361 | 12367 |
| 12449 | 12456-12457 |
| 12458 | 12467 |
| 12557 | 12567 |
| 13445 | 13456-13457 |
| 13454 | 13467 |
| 13553 | 13567 |
| 14552 | 14567 |
| 23440 | 23456-23457 |
| 23449 | 23467 |
| 23548 | 23567 |
| 24547 | 24567 |
| 34546 | 34567 |
| 123434 | 123456-123457 |
| 123443 | 123467 |
| 123542 | 123567 |
| 124541 | 124567 |
| 134540 | 134567 |
| 234539 | 234567 |

For #HARQs=7. Index_min=5280 are defined in Table 7.

TABLE 7

| Shift Parameter | $H_m$ Range |
|---|---|
| 123455 | 123456-123457 |
| 123464 | 123467 |

TABLE 7-continued

| Shift Parameter | $H_m$ Range |
|---|---|
| 123562 | 123567 |
| 124562 | 124567 |
| 134561 | 134567 |
| 234560 | 234567 |
| 1234559 | 1234567 |

For #HARQs=8, Index_min=6304 are defined in Table 8.

TABLE 8

| Shift Parameter | $H_m$ Range |
|---|---|
| 1234566 | 1234567 |

According to embodiments, it is noted that when the decoded $H_m$ contains one lesser number of digits than the #HARQs for that index range, it automatically means that the first digit is a 0 (which is not reflected in the decimal number of $H_m$.)

According to some embodiments, as a first alternative the form of the encoding and decoding equations can also be used to map the HARQ ID-NDI pairs to the indexes.

For two HARQ IDs, HARQ1 and HARQ2, an encoding expression of the form as defined in Equation 7, wherein:

$$\text{Index}=\text{Index\_max}-1-C(8-\text{HARQ1},2)-\text{HARQ1}+\text{HARQ2} \quad (7)$$

It is noted that this configuration provides a unique mapping when jointly coded with NDI, where Index_max=128 is the final value of the index for #HARQ=2 as defined in TABLE 1.

According to some embodiments, the Index calculation can be performed using a sum of HARQ IDs and nchoosek factors. The equation to calculate the Index that represents the HARQ processes to be scheduled can be written as a scalar plus a combinatoric sum of the HARQ IDs scheduled where the combinatoric sum includes at least the sum of binomial functions of HARQ IDs and the HARQ IDs. A set of equations are needed where there is one equation to calculate the index for a certain number of HARQ processes to be scheduled (i.e. 'n'). If 'n' is the number of HARQ processes to be scheduled, then the index for "n" scheduled HARQs can be written in a general form as defined in Equation 8.

$$\text{Index}'=C+\text{sum}(J_i*\text{HARQ}(i))+\text{sum}(K_i*\text{nchoosek}(\text{HARQ\_Max}-L_i-\text{HARQ}(i),M_i)) \quad (8)$$

where:
n is the number of HARQ processes to be scheduled, e.g. the number of HARQ processes to be conveyed by the index;
i is 1 to n;
HARQ_Max is the maximum number of HARQ processes, e.g. the maximum number of HARQ processes that can be conveyed by the index;
HARQ(i) is the HARQ ID of the i'th HARQ process scheduled and has values in the range {0, HARQ_Max−1};
J, K, L, M are vectors of constants of size n;
C is a scalar constant;
nchoosek(.) is the binomial coefficient function.

Having regard to Equation 8, it is noted that for example, HARQ(1) is the HARQ ID of the $1^{st}$ scheduled HARQ process, HARQ(2) is the HARQ ID of the $2^{nd}$ scheduled HARQ process. For "n" between 2 and HARQ_Max−1, a more specific but still general form of the Equation 8 can be written as Equation 9:

$$\text{Index}' = -\text{HARQ}(n) + \text{HARQ}(n-1) + \text{nchoosek}(\text{HARQ\_Max} - \text{HARQ}(n-1), 2) + \text{sum}(\text{nchoosek}(\text{HARQ\_Max} - 1 - \text{HARQ}(n-i), 1+i)) \quad (9)$$

where: i=2 to n−1

Having regard to Equation 9, it is noted that if k<0 or (n−k)<0, nchoosek(n,k) returns 0. In some embodiments, an offset 'Index_max' to the final index maybe added wherein Index=Index_max−Index'. In other embodiments, the indexes could be calculated in reverse order, in which case Index=Index_min+Index'.

Having regard to Equations 8 and 9, if J=0, K=1 and L=0, these equations can be rewritten as defined in Equation 10:

$$\text{Index}' = C + \text{sum}(\text{nchoosek}(\text{HARQ\_Max} - \text{HARQ}(n-i), Mi)) \quad (10)$$

where: n=the number of HARQ processes to be scheduled;
i=0 to n−1;
HARQ_Max=the maximum number of HARQ processes;
HARQ(i)=the HARQ ID of the i'th HARQ process scheduled and has values in the range {0, HARQ_Max−1};
Mi=n−i;
C=a scalar constant;
nchoosek(n,k.)=the binomial coefficient function;
wherein if (n−k)<0, nchoosek(n−k) returns 0.

According to some embodiments, the Index could also be scaled by nchoosek(HARQ_Max, n)*NDI_decimal for every n, if the scheduled HARQ IDs and NDI are jointly encoded. For example, the index and the NDI can be jointly encoded as a second index. As will be further defined herein, for example in TABLE 9, in some embodiments, the position of the index and the NDI fields within the second index can depend on the number of HARQ processes being scheduled. For example, the position may be envisioned as the position of the index and the NDI fields within TABLE 9.

As an example, if HARQ_Max is 4, then:

For #HARQs scheduled n=1, then: Index'=3−HARQ(1), Index_max=3, then: Index=HARQ(1).

For #HARQs scheduled n=2, then: Index'=−HARQ(2)+HARQ(1)+nchoosek(4−HARQ(1), 2), Index_max=9, then: Index=9−(−HARQ(2)+HARQ(1)+nchoosek(4−HARQ(1))).

For #HARQs scheduled n=3, then: Index'=−HARQ(3)+HARQ(2)+nchoosek(4−HARQ(2),2)+nchoosek(3−HARQ(1),3), Index_max=13, then: Index=13−(−HARQ(3)+HARQ(2)+nchoosek(4−HARQ(2), 2)+nchoosek(3−HARQ(1), 3)).

For #HARQs scheduled n=4, then: Index'=0 Index_max=14, then: Index=14.

It is noted that in the above example, for the Index calculations the Index value is unique for all combinations of scheduled HARQs.

Continuing with this example, if the base station wants to schedule HARQ IDs={0, 2, 3}, namely #HARQs scheduled n=3, where HARQ(1)=0, HARQ(2)=2,HARQ(3)=3 the index is determined as follows: Index=13−(−HARQ(3)+HARQ(2)+nchoosek(4−HARQ(2), 2)+nchoosek (3−HARQ (1), 3)), which reduces to Index=13−(−(3)+(2)+nchoosek(4−(2), 2)+nchoosek (3−(0),3))=13−1=12. Accordingly, the Index is equal to 12.

Further continuing with this example, if the base station wants to schedule HARQ IDs={0, 3}, namely #HARQs scheduled n=2, where HARQ(1)=0, HARQ(2)=3, the index is determined as follows: Index=9−(−HARQ(2)+HARQ(1)+nchoosek(4−HARQ(1), 2)), which reduces to Index=9−(−3+0+nchoosek(4−0,2))=9−3=6. Accordingly, the Index is equal to 6.

According to some embodiments, instead of joint coding of NDI with HARQ ID, the NDI bits and HARQ index can be assigned to different bit positions for the different values of 'n' such that joint coding is not needed between HARQ ID and NDI's and where Index_min can be set to ensure there is no overlap. For example, the 7-bit pattern defined below in TABLE 9 can be used to implement the above example when HARQ_Max=4:

TABLE 9

| Bits | 1 | 2 | 3 | 4 | 5 | 6 | 7 |
|---|---|---|---|---|---|---|---|
| 1 HARQ | 0 | 0 | 0 | 0 | HARQ Index 00-11 | | NDI-1 |
| 2 HARQS | 0 | HARQ Index range: 001-110 | | | — | NDI-2 | NDI-1 |
| 3 HARQS | HARQ Index range: 0111-1010 | | | | NDI-3 | NDI-2 | NDI-1 |
| 4 HARQS | HARQ Index: 111 | | | NDI-4 | NDI-3 | NDI-2 | NDI-1 |

Based on TABLE 9, if one HARQ process is scheduled, HARQ index is bits [5-6], NDI bit 7, Index_max=3, then: Index=HARQ(1).

Based on TABLE 9, if two HARQ processes are scheduled, HARQ index is bits [2-4], NDI bits [6-7], Index_max=6, then: Index=6−(−HARQ(2)+HARQ(1)+nchoosek(4−HARQ(1))).

Based on TABLE 9, if three HARQ processes are scheduled, HARQ index is bits [1-4], NDI bits [5-7], Index_max=10, then: Index=10−(−HARQ(3)+HARQ(2)+nchoosek(4−HARQ(2), 2)+nchoosek(3−HARQ(1), 3)).

Based on TABLE 9, if four HARQ processes are scheduled, HARQ index is bits [1-3], NDI bits [4-7], Index_max=7, then: Index=7.

According to some embodiments, this technique can also be used to add one or more of redundancy version (RV), frequency hopping flags and other information needed for grants without the need for jointly encoding thereof.

According to some embodiments, as a second alternative the form of the encoding and decoding equations can be defined such that an approximate encoding expression can be obtained by applying regression techniques. For example, for #HARQ=2, by generating the HARQ number, $H_m$, we obtain encoding Equation 8, wherein:

$$\text{Index} = \text{round}(a1*\sin(b1*H_m+c1)+a2*\sin(b2*H_m+c2)+a3*\sin(b3*H_m+c3)+a4*\sin(b4*H_m+c4)+a5*\sin(b5*H_m+c5)+a6*\sin(b6*H_m+c6)) \quad (8)$$

where {a1, a2, . . . , a6}={63.26, 33.19, 11.72, 0.6085, 4.657, 0.6238}, {b1, b2, . . . , b6}={0.04698, 0.08573, 0.1482, 0.5777, 0.1775, 0.6262}, and {c1, c2, . . . , c6}={−0.2324, 1.734, 2.922, −1.434, 5.169, 2.694} and round(.) is the rounding operation to the nearest integer.

Figure 6:
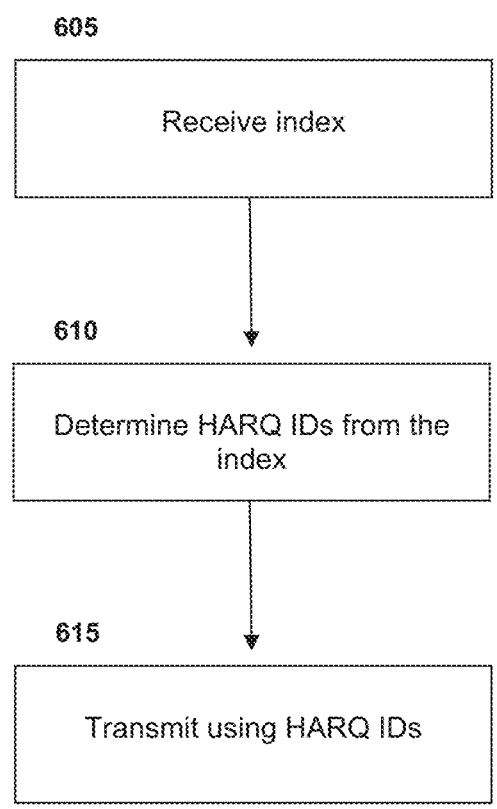
FIG. 6 illustrates a method for facilitating transmissions in a wireless communication system in accordance with embodiments of the present invention.

According to embodiments there is provided a method for facilitating transmissions in a wireless communication system. With reference to FIG. 6, the method includes receiving 605, by a user equipment (UE), an index indicative of a hybrid automatic repeat request (HARQ ID) for use during transmissions, the index defined using a sum of HARQ IDs and a binomial coefficient function. The method further including determining 610, by the UE, the HARQ ID from the index and transmitting 615, by the UE, a transmission using the HARQ ID.

Various embodiments of the present invention relate to an apparatus or system of apparatuses. An apparatus may take the form of a communication device in a wireless communication system supporting one or both of gap insertion and DCI reconfiguration, such as an LTE wireless communication system. In some embodiments, the communication device is a wireless subscriber terminal, such as a user equipment (UE), handheld cell phone, PDA, M2M device, or the like. In some embodiments, the communication device is a base station, such as an eNB, gNB or other base station configuration.

As will be readily understood by a worker skilled in the art, a communication device may comprise various structural elements, such as a power source, microprocessor, memory, signal processing section, radiofrequency (RF) electronics section, antenna, and the like. In various embodiments, an existing communication device, such as a UE, M2M device, eNB, gNB, base station, or the like, which is configured to operate in a wireless communication system such as an LTE system, may be further configured to perform various operations such as gap insertion and DCI reconfiguration, in accordance with the present invention. Such configurations may be via new software routines loaded into memory of the device and used to guide operation thereof, or similarly via new firmware routines loaded into memory for use by appropriate components such as a microcontroller or digital signal processor. Additionally or alternatively, configuration may be performed by incorporating appropriate specialized hardware, such as electronic components, microcontrollers, logic arrays, signal processing electronics, or the like, into the device. A worker skilled in the art would understand how to adjust operation of an existing communication device or to create a new communication device having the desired operating characteristics as described herein.

Figure 7:
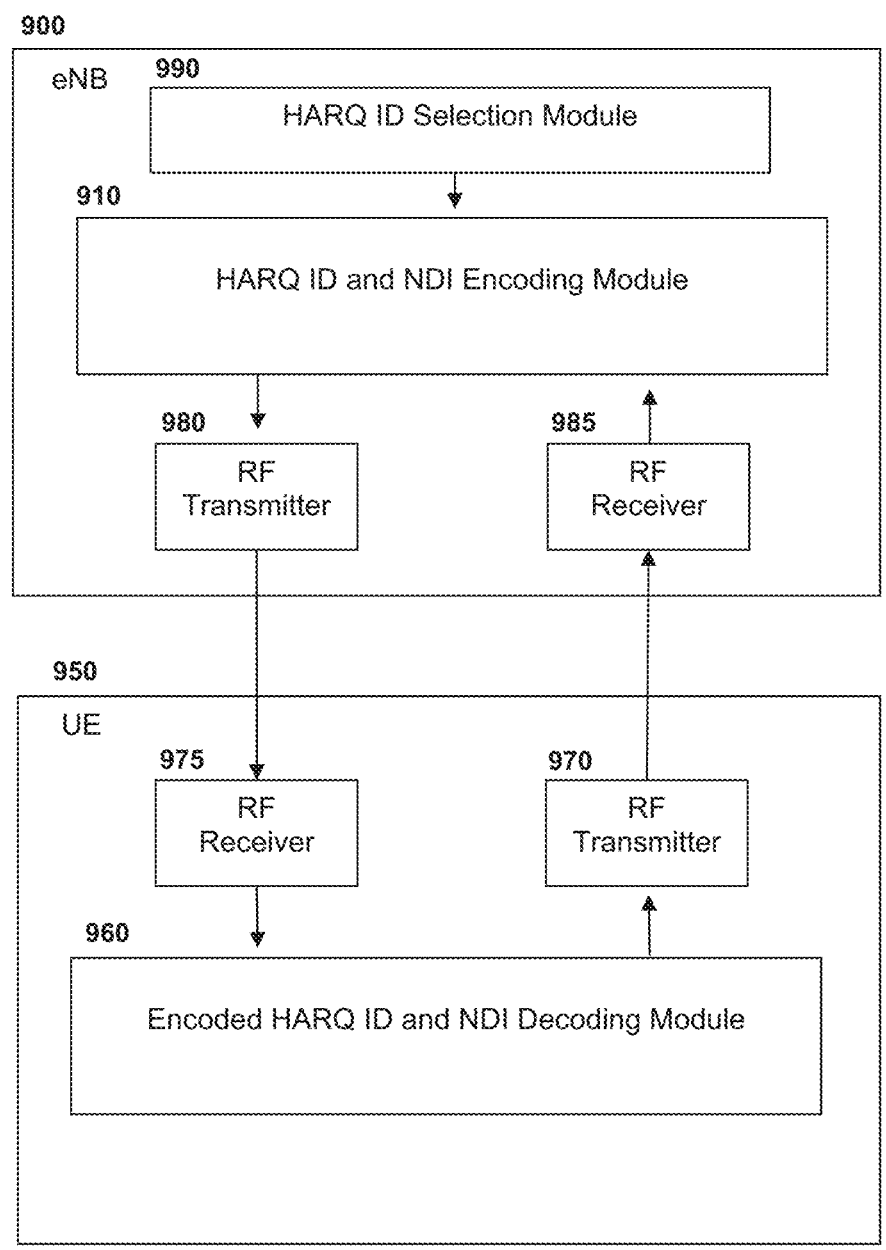
FIG. 7 illustrates a system provided in accordance with embodiments of the present invention.

FIG. 7 illustrates a system comprising an evolved Node B (eNB) or gNB or other base station configuration 900 and a user equipment (UE) 950 in a wireless communication system, for example a Long Term Evolution (LTE) communication system. The UE 950 comprises an encoded HARQ ID and NDI decoding module 960, which is configured to decode the encoded HARQ ID and NDI received from the eNB or gNB. The UE 950 further comprises various other features such as a wireless communication module, comprising a RF transmitter 970 and RF receiver 975, the wireless communication module configured to facilitate communication with the eNB via an appropriate protocol, such as LTE. Other functionalities of a UE configured to operate in accordance with a standard such as LTE would be readily understood by a worker skilled in the art.

The eNB 900 comprises a HARQ ID and NDI encoding module 910 which is configured to encode the HARQ ID and NDI. The eNB 900 further comprises various other features such as a wireless communication module, comprising a RF transmitter 980 and RF receiver 985, the wireless communication module configured to facilitate communication with the UE via an appropriate protocol, such as LTE. The eNB further comprises a HARQ ID selection module 990 which is configured to select the one or more HARQ IDs for use during transmissions. Other functionalities of an eNB configured to operate in accordance with a standard such as LTE would be readily understood by a worker skilled in the art.

As will be readily understood by the description above, the terms base station and network node can be interchangeably used to define an evolved NodeB (eNB), a next generation NodeB (gNB) or other base station or network node configuration.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a magnetic or optical wire, tape or disc, or the like, for storing signals readable by a machine, for controlling the operation of a computer according to the method of the invention and/or to structure some or all of its components in accordance with the system of the invention.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for facilitating transmissions in a wireless communication system, the method comprising:

receiving by a user equipment (UE), an index indicative of one or more hybrid automatic repeat request identifiers (HARQ IDs) for use during transmissions, the index defined using a constant, C, and a sum of binomial coefficient function;

determining, by the UE, the one or more HARQ IDs from the index; and transmitting, by the UE, a transmission using the one or more HARQ IDs;

wherein the index is defined by:

Index'=C+sum(nchoosek(HARQ_Max−HARQ($n-i$), Mi)

where: n=the number of HARQ processes to be scheduled;

i=0 to n−1;

HARQ_Max=the maximum number of HARQ processes;

HARQ(i)=the HARQ ID of the i'th HARQ process scheduled and has values in the range {0, HARQ_Max−1};

Mi=n−i;

C=a scalar constant;

nchoosek(n,k.)=the binomial coefficient function;

wherein if (n−k)<0, nchoosek(n−k) returns 0.

2. The method according to claim 1, wherein the sum is a combinatoric sum including at least a sum of binomial functions of HARQ IDs.

3. The method according to claim 1, wherein the sum is a combinatoric sum including at least a sum of binomial functions of a number of HARQ processes conveyed by the index.

4. The method according to claim 1, wherein the sum is a combinatoric sum including at least a sum of binomial functions of a maximum number of HARQ processes conveyed by the index.

5. The method according to claim 1, wherein C depends on a number of HARQ processes being scheduled.

6. The method according to claim 1, wherein the index and a new data indication (NDI) are jointly encoded into a second index.

7. The method according to claim 6, wherein a position of the index and NDI fields within the second index depend on a number of HARQ processes being scheduled.

8. The method according to claim 1, wherein the index is defined by:

$$\text{Index}' = C + \text{sum}(J_i * \text{HARQ}(i)) + \text{sum}(K_i * \text{nchoosek}(\text{HARQ\_Max} - L_i - \text{HARQ}(i), M_i))$$

where: n is the number of HARQ processes to be scheduled;

i is 1 to n;

HARQ_Max is the maximum number of HARQ processes;

HARQ(i) is the HARQ ID of the i'th HARQ process scheduled and has values in the range {0, HARQ_Max−1};

J, K, L, M=vectors of constants of size n;

C=a scalar constant;

nchoosek(.)=the binomial coefficient function.

9. A user equipment (UE) comprising:

a processor; and machine readable memory storing machine executable instructions which when executed by the processor configure the base station to:

receive an index indicative of one or more hybrid automatic repeat identifiers (HARQ IDs) for use during transmissions, the index defined using a constant, C, and a sum of a binomial coefficient function;

determine the one or more HARQ IDs from the index; and transmit a transmission using the one or more HARQ IDs;

wherein the index is defined by:

$$\text{Index}' = C + \text{sum}(\text{nchoosek}(\text{HARQ\_Max} - \text{HARQ}(n-i), M_i))$$

where: n=the number of HARQ processes to be scheduled;

i=0 to n−1;

HARQ_Max=the maximum number of HARQ processes;

HARQ(i)=the HARQ ID of the i'th HARQ process scheduled and has values in the range {0, HARQ_Max−1};

Mi=n−i;

C=a scalar constant;

nchoosek(n,k.)=the binomial coefficient function;

wherein if (n−k)<0, nchoosek(n−k) returns 0.

10. The UE according to claim 9, wherein the sum is a combinatoric sum including at least a sum of binomial functions of HARQ IDs.

11. The UE according to claim 9, wherein the sum is a combinatoric sum including at least a sum of binomial functions of a number of HARQ processes conveyed by the index.

12. The UE according to claim 1, wherein the sum is a combinatoric sum including at least a sum of binomial functions of a maximum number of HARQ processes conveyed by the index.

13. The UE according to claim 9, wherein C depends on a number of HARQ processes being scheduled.

14. The UE according to claim 9, wherein the index and a new data indication (NDI) are jointly encoded into a second index.

15. The UE according to claim 14, wherein a position of the index and NDI fields within the second index depend on a number of HARQ processes being scheduled.

16. The UE according to claim 9, wherein the index is defined by:

$$\text{Index}' = C + \text{sum}(J_i * \text{HARQ}(i)) + \text{sum}(K_i * \text{nchoosek}(\text{HARQ\_Max} - L_i - \text{HARQ}(i), M_i))$$

where: n is the number of HARQ processes to be scheduled;

i is 1 to n;

HARQ_Max is the maximum number of HARQ processes;

HARQ(i) is the HARQ ID of the i'th HARQ process scheduled and has values in the range {0, HARQ_Max−1};

J, K, L, M=vectors of constants of size n;

C=a scalar constant;

nchoosek(.)=the binomial coefficient function.

* * * * *